United States Patent Office 3,369,362
Patented Feb. 20, 1968

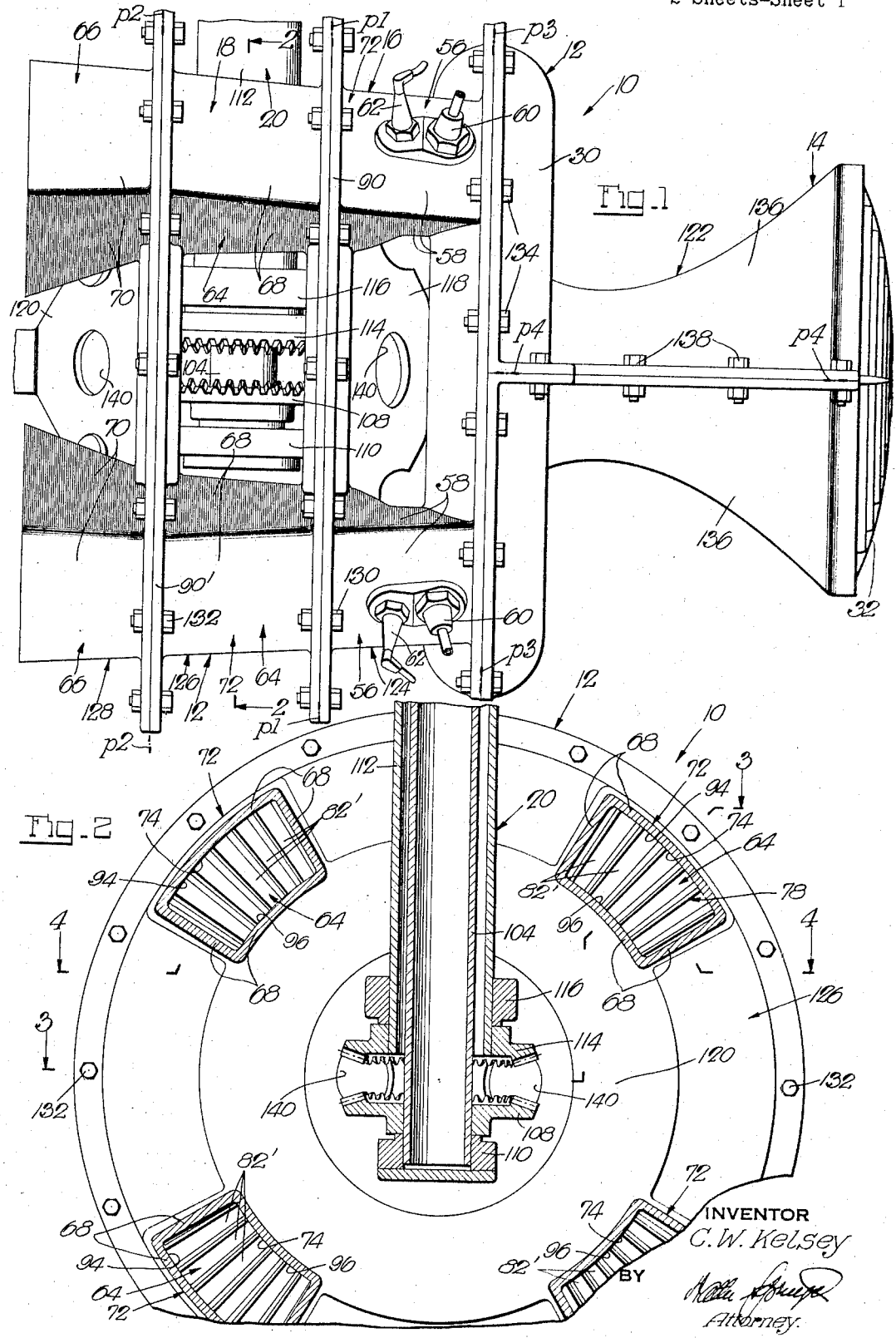

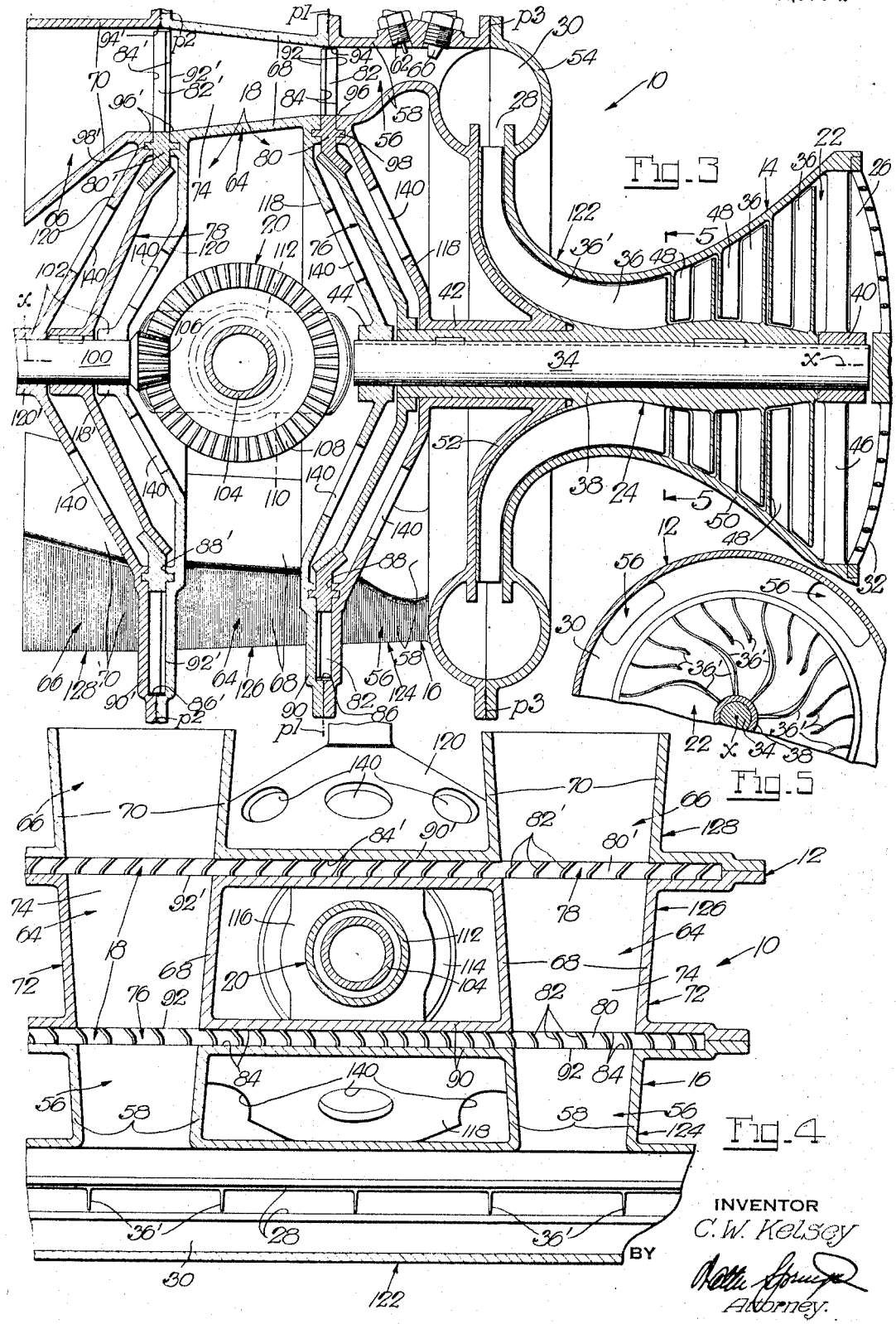

3,369,362
GAS TURBINE ENGINE
Cadwallader W. Kelsey, Guilford, Conn., assignor to Skycar, Inc., New Haven, Conn., a corporation of Connecticut
Filed Sept. 26, 1966, Ser. No. 581,796
14 Claims. (Cl. 60—39.16)

This invention relates to engines in general, and to turbine engines in particular.

The present invention is concerned with turbine engines having an air compressor which forces air into a plurality of combustion chambers in which the air and injected liquid fuel maintain constant combustion the gases of which operate a turbine system for the power output as well as for the drive of the compressor. In most prior engines of this type the gases from the individual combustion chambers pass into and through a ring-like turbine chamber and escape through a therewith continuous exhaust chamber, with the active blades of a turbine wheel or wheels projecting into the ring chamber so as to be driven by the passing gases. While these prior engines perform satisfactorily, they are subject to extreme heating of their turbine system and especially of the vital turbine wheels so much so that despite their construction from the most heat-resistant metals and special surface treatment of their blades their useful life is relatively short and their eventual costly replacement inevitable.

It is among the objects of the present invention to provide a turbine engine of this type which performs at least as efficiently as these prior engines, but its turbine system is subject to much less heating in operation so that replacement of a turbine wheel or wheels is the exception rather than the rule and the reliability of the engine in its operation is also enhanced.

It is another object of the present invention to provide a turbine engine of this type in which the turbine chamber is for all practical purposes closed to the individual combustion chambers except for zones thereof which are open to and continuous with the latter, so that the operating blades of the turbine wheel or wheels are subjected to the extremely hot combustion gases, not constantly as heretofore, but only on their passage through these zones of the turbine chamber. With this arrangement, the paths of the turbine blades between the zones of the turbine chamber are, in comparison to their paths through these zones, highly effective cooling paths in any event that keep these blades at moderated heat levels which they will withstand for the longest time.

It is a further object of the present invention to provide a turbine engine of this type of which the heat-subjected components are to an exceptional extent exposed to the surrounding atmosphere for their optimum heat transfer thereto, to thereby keep the heat in all parts of the engine at levels way below those at which any adverse effects on them from overheating would manifest themselves. This is achieved by providing an engine casing in which a turbine shaft is journalled, and which for its combustion and turbine system has separate open-ended duct formations about and substantially parallel to this shaft, of which each duct formation is with its entire peripheral wall exposed to the atmosphere, and the turbine chamber is formed by a ring-like track in the casing into which the rim and therefrom extending blades of a turbine wheel on the shaft extend with a running fit and which is closed except where traversed by the duct formations at which the aforementioned zones of the turbine chamber are formed. With this arrangement, the zones of the turbine chamber within the individual duct formations define on the opposite sides thereof combustion and exhaust chambers in these formations and the turbine blades are in the track out of impinging relation with the combustion gases except on their passage through the zones of the turbine chamber, wherefore they are only intermittently subjected to the maximum heat effect from these gases. Further, the turbine wheel may, with the exception of its rim and blades in the track, be advantageously exposed to the atmosphere not only on the side thereof facing the combustion chambers but also on the opposite side because the gases from the individual combustion chambers escape through individual exhaust chambers and not through a common exhaust chamber as heretofore. Last but by no means least, and in contrast to prior engines of this type in which more than one turbine wheel are arranged in a common turbine chamber and the high velocity gases from the individual combustion chambers expand in the turbine chamber between the first and second turbine wheels to some extent at a corresponding loss of velocity, the combustion gases in the present engine of like multiple turbine wheel arrangement will, by virtue of the track arrangement for the turbine blades, have little space available to which to expand from their prescribed course through the individual zones of the turbine chamber with ensuing maximum impingement of these gases on the blades of the successive wheels.

Another object of the present invention is to provide a turbine engine of this type having separate axially aligned turbine wheel carrying shafts for independent power output and drive of the air compressor, and the aforementioned duct formations of, and blade tracks in, the engine casing, of which the casing has, for adequate structural strength as well as for its ready assembly and disassembly in simple and readily machined sections, disc-like spider formations which join the duct formations and provide adequate bearings for both shafts, with these spider formations flanking each turbine wheel on both sides and thereby enclosing it to its rim, but having apertures through which each enclosed wheel is exposed to the atmosphere for heat transfer thereto.

It is another object of the present invention to provide a turbine engine having the aforementioned separate shafts, of which the compressor drive shaft which carries the turbine wheel next to the combustion chambers extends forwardly toward and beyond the inlet ends of these chambers and the other, power, shaft carries the other turbine wheel intermediate its ends and extends therefrom toward the discharge ends of the exhaust chambers with its rear end, with the enclosed turbine wheels being sufficiently spaced to permit power take-off from between these shaft by means of meshing bevel gears on the forward end of the power shaft and on a take-off shaft which is journalled in a bearing bracket on the casing and extends between and beyond adjacent duct formations of the casing for its coupling to a transmission or directly to a load unit. With this arrangement, the exhaust chambers may extend axially for non-impeded escape of the spent combustion gases, rather than in curved escape-impeding fashion to bypass a transmission or load unit at the rear end of the power shaft as in some prior engines. Also, with this power take-off, the shafts may be quite short and the engine itself be of rather limited length.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view of a turbine engine embodying the present invention;

FIG. 2 is a section through the engine taken substantially on the line 2—2 of FIG. 1;

FIG. 3 is a section through the engine taken substantially on the line 3—3 of FIG. 2;

FIG. 4 is a fragmentary section through the engine taken substantially on the line 4—4 of FIG. 2; and FIG. 5 is a reduced fragmentary section through the engine taken substantially on the line 5—5 of FIG. 3, but with a part of the engine removed.

Referring to the drawings, the reference numeral 10 designates a turbine engine having as its major components a casing 12, an air compressor 14, a combustion aggregate 16, a turbine system 18 and a power output 20. The turbine system comprises in this instance separate turbine wheels for the power output and for the drive of the air compressor. The casing 12 is, for ready assembly and disassembly of the engine, formed in separate sections which may advantageously be castings that require a minimum of machining.

The air compressor 14 comprises a chamber 22 and an impeller 24 of which the chamber 22 is in this instance formed by the engine casing 12. The compressor chamber 22, which is annular in section about the engine axis $x$, extends from its inlet 26 axially rearwardly for some distance and then continues in outwardly diverging or curved fashion to its outlet 28 for radial discharge of the compressed air into a manifold 30. The inlet 28 of the compressor chamber 22 is preferably covered with a louver 32. The impeller 24 has a drive shaft 34 and multi-stage impeller blades 36 which in this instance are formed with an integral hub 38 that is keyed to the shaft 34. The impeller shaft 34 is journalled in suitable front and rear bearings 40 and 42, 44 of which the front bearing 40 is formed by a spider arm 46 at the inlet 26 of the compressor chamber 22, and the rear bearings 42 and 44 are formed by other parts of the engine casing 12, with the shaft 34 being journalled in the bearing 42 in this instance through intermediation of the impeller hub 38. Cooperating with the impeller blades 36 are fixed guide vanes 48 which in this instance are formed integrally with the peripheral wall 50 of the compressor chamber 22. This peripheral wall 50 has over part of its extent a spaced opposite companion wall 52 to keep the chamber 22 closed to its outlet 28. The last-stage impeller blades 36' extend close to the outlet 28 of the chamber 22 (FIG. 3) and are curved as shown in FIG. 5. The manifold 30 is in this instance ring-shaped about the axis $x$ and has a wall 54 which is cylindrical in section (FIG. 3).

The combustion aggregate 16 comprises a plurality of combustion chambers 56, in this instance four, which branch from the rear side of the manifold 30 and extend in the general direction of the axis $x$. These combustion chambers 56 are equi-angularly spaced about the axis $x$ and have walls 58 which are generally rectangular in cross-section. Each combustion chamber 56 has mounted in its wall 58 a fuel nozzle 60 and a spark plug 62, with liquid fuel being injected through the nozzles 60 to maintain combustion in the chambers 56, and the spark plugs 62 serving to ignite the fuel-air mixture to start the engine on introducing into the chambers 56 compressed air other than from the compressor 14 is well-known manner. The combustion chambers 56 are continuous with expansion chambers 64 and exhaust chambers 66 having walls 68 and 70, respectively, of generally rectangular cross-section. Each of the combustion chambers 56 and the therewith continuous expansion and exhaust chambers 64 and 66 are formed by a duct formation 72 of the casing 12 providing a through-passage 74 from the manifold 30 to the exhaust chamber 66.

The turbine system 18 comprises two turbine wheels 76 and 78 of which the wheel 76 is for the drive of the air compressor 14 and the wheel 78 is for the power output of the engine. Wheel 76, which is nearest the combustion chambers 56, is suitably mounted to the rear end of the impeller hub 38 and has an annular rim 80 from which the turbine blades 82 project outwardly. The rim 80 and blades 82 of the wheel 76 extend into an annular groove 84 about the axis $x$, with this groove having a bottom 86 and an open top 88 of which the latter faces the axis $x$ (FIG. 3). The groove 84, which is provided in a rib formation 90 that joins the individual duct formations 72 of the casing 12, traverses or intersects at 92 the through-passages 74 in the duct formations 72, with the opposite wall surfaces 84 and 96 of these through-passages being at least at the groove-intersection 92, and preferably throughout their lengths, circular about the axis $x$ (see also FIG. 2), and the bottom 86 of the groove 84 being continuous with the wall surfaces 94 at the intersections. The rim 80 and blades 82 of the wheel 76 are received in the groove 84 with a running fit, with the rim 80 extending in the groove from its open top 88 to the circular wall surfaces 96 of the passages 74, and the blades extending in the remainder of the groove so as to be in full impinging relation with the combustion gases from the combustion chambers 56 (FIGS. 3 and 4). The rim 80 of the wheel 76 preferably has at 98 additional guidance in the groove 84 to seal the latter against leakage of combustion gases through its top 88 (FIG. 3).

The other turbine wheel 78 is mounted on a shaft 100 in a bearing 102 provided by the casing 12. This wheel 78 is quite similar to the described wheel 76, having an annular rim 80' and therefrom projecting turbine blades 82' which are received with a running fit in an annular groove 84' in a rib formation 90' which also joins the duct formations 72 of the casing 12. The groove 84' also intersects at 92' the passages 74 through the duct formations 72 of the casing 12, and in its relation to the wheel 78 and to the passages 74 is quite similar as is the groove 84 in its described relation to the wheel 76 and passages 74, wherefore the same reference numerals with the suffix (') are applied for the related parts of the groove 84' wheel 78 and passage 74.

The blades of the turbine wheels 76 and 78 projecting into the through-passages 74 in the duct formations 72 of the casing 12 in fact divide the same into the combustion, expansion and exhaust chambers 56, 64 and 66, of which the expansion chambers 64 conduct the combustion gases beyond the first turbine wheel 76 into impinging relation with the blades 82' of the next and final, power output, turbine wheel 78 and the exhaust chambers 66 permit unimpeded, straight rearward, escape of the spent combustion gases.

The power output 20 includes the turbine wheel 78 and its shaft 100, and further provides a take-off shaft 104 transverse, and in this instance normal, to the shaft 100 and arranged between the turbine wheels 76 and 78, and suitable gearing, in this instance bevel gearing, for drivingly connecting the shafts 100 and 104. Thus, the shaft 100 which is coaxial with, but spaced from the compressor shaft 34, is at its forward end provided with a bevel gear 106 which is in permanent mesh with a companion gear 108 on the shaft 104 that is journalled in a suitable bearing 110 on the casing 12, with the gears 106 and 108 being arranged in the space between the shafts 34 and 100 (FIG. 3). The take-off shaft 104 extends with its axis between adjacent duct formations 72 of the casing (FIG. 4) for its coupling to a load unit. With the load unit being in this exemplary case oppositely-driven coaxial impeller wheels for a vertical take-off aircraft (not shown), there is in this instance provided a second take-off shaft 112 which carries a bevel gear 114 in mesh with the driver gear 106 (FIGS. 1 and 3), with the shafts 104 and 112 being coaxial and telescoped, and shaft 112 being journalled in a suitable bearing 116 (FIGS. 2 and 4).

The rib formations 90 and 90' on the casing 12 have in this instance pairs of inward disc extensions 118 and 120, respectively, of which the extensions 118 flank the turbine wheel 76 on both sides and provide the rear bearings 42 and 44 for the compressor shaft 34 in preferred close proximity to the turbine wheel 76 (FIG. 3), with the bearing part 42 of one of these extensions continuing as the wall part 52 of the compressor chamber 22. The other disc extensions 120 flank the other turbine wheel 78 on both sides and provide the bearing 102 for the shaft 100 in preferred spaced sections 118′ and 120′ in close proximity to the wheel 78 (FIG. 3).

The engine casing 12 is, for ready assembly and disassembly of the engine, formed in separate, preferably cast, sections 122, 124, 126 and 128 which are of minimum weight owing to their formation throughout as walls of adequate thickness for the required strength, and which also require a minimum of machining. Thus, the casing sections 124 to 128 are parted in planes p1 and p2 which extend normal to the axis x and pass through the respective rib formations 90 and 90′ (FIG. 3). With this arrangement, the abutting surfaces of, and the complemental parts of the grooves 84 and 84′ in, the casing sections 124 and 128 are readily machined, and the turbine wheels 76 and 78 and their respective shafts 34 and 100 are readily installed, with these casing sections being in assembled condition simply bolted together as at 130 and 132 (FIGS. 1 and 2). The casing section 122 is also parted in a plane p3 normal to the axis x for its abutment with the adjoining casing section 124 and mount thereon by bolts 134 (FIGS. 1 and 3), but the section 122 is further formed in two subsections 136 which are parted in a plane p4 in which the axis x lies and which are bolted together at 138 (FIG. 1). The casing section 122 is formed in the subsections 136 to permit the assembly of the impeller 24 and the compressor chamber 22 with its fluted wall 50′ (FIG. 3).

It will be noted that the individual duct formations 72 of the casing 12 are externally exposed to the atmosphere peripherally throughout except at the joining rib formations 90 and 90′. With this arrangement, the heat-subjected components are to an exceptional extent exposed to the surrounding atmosphere, whereby the heat in all parts of the engine is kept at levels way below those at which any adverse effects on them from overheating would manifest themselves. Further, with the present engine lacking for all practical purposes a common turbine chamber, and the turbine blades 82 and 82′ being, instead, fittedly confined in the respective grooves 84 and 84′ and subjected to the impinging combustion gases only at the separated zones where these grooves intersect the passages 74 through the duct formations 72, the paths of these blades between these zones are, in comparison to their paths through these zones, highly effective cooling paths in any event that keep these blades at moderate heat levels which they will withstand for the longest time. Effective cooling of the engine is even enhanced by providing apertures 140 in the wheel-enclosing disc formations 118 and 120 of the casing 12 through which the respective turbine wheels 76 and 78 are exposed to the atmosphere. These wheels are thus on both sides exposed to the atmosphere, with the wheel 78 being at its rear face made accessible to the atmosphere at normal temperature owing to the separate exhaust chamber 66 of each duct formation 72, as will be readily understood. Also, the combustion gases in the present engine will, by virtue of the track-like groove arrangement for the turbine blades, have little space available to which to expand from their prescribed course through the passages in the duct formations of the casing, with ensuing maximum impingement of these gases on the blades of both wheels.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a turbine engine, the combination with an air compressor having a drive shaft with an axis and an outlet, of a casing having spaced duct formations with through-passages about and longitudinally of said axis, of which said passages have spaced opposite first and second surfaces most remote from and nearest to said axis, repectively, and a rib formation transversely of and joining said duct formations and forming about said axis an annular groove with a closed bottom and open top, said groove intersecting said passages, and said first and second passage surfaces being at the groove-intersections cylindrical about said axis, with said groove bottom being continuous with said first cylindrical passage surfaces, and said open groove top facing said axis and being spaced therefrom closer than said second cylindrical passage surfaces; a turbine wheel carried by said shaft and having an annular rim and therefrom outwardly projecting blades received with a running fit in said groove, with said rim extending between said groove top and second passage surfaces and said blades extending in the remainder of said groove, said blades dividing said passages into combustion and exhaust chambers, and said duct formations being externally exposed to the atmosphere peripherally throughout except at said rib formation; and conduit means between said compressor outlet and combustion chambers.

2. The combination in a turbine engine as in claim 1, in which said passages have spaced opposite side surfaces which join said first and second surfaces and at the groove-intersections extend substantially radially of said axis.

3. The combination in a turbine engine as in claim 1, in which said casing has about said axis a ring-like manifold from one side of which said duct formations branch, and said conduit means connect said compressor outlet with said manifold.

4. The combination in a turbine engine as in claim 1, in which said casing has a spider formation extending from said rib formation inwardly toward said axis and providing a bearing for said shaft.

5. The combination in a turbine engine as in claim 1, in which said casing is formed in sections parted in a plane normal to said axis and passing through said groove to leave said sections with complemental parts of said rib formation, and said rib formation parts have inward disc extensions flanking both sides of and enclosing said wheel to said rim thereof and forming aligned bearings for said shaft, with said disc extensions having apertures through which to expose said wheel to the atmosphere.

6. In a turbine engine, the combination with an air compressor having a drive shaft with an axis and an outlet, and a power output shaft and bearing means therefor coaxial with said drive shaft, of a casing having spaced duct formations with through-passages about and longitudinally of said axis, of which said passages have spaced opposite first and second surfaces most remote from and nearest to said axis, respectively, and two spaced rib formations extending transversely of and joining said duct formations, of which each rib formation forms about said axis an annular groove with a closed bottom and open top, said grooves intersecting said passages, and said first and second passage surfaces being at the groove-intersections cylindrical about said axis, with said groove bottoms being continuous with the associated first cylindrical passage surfaces, and said open groove tops facing said axis and being spaced therefrom closer than the associated second cylindrical passage surfaces; two turbine wheels carried by said shafts, respectively, of which each wheel has an annular rim and therefrom outwardly projecting blades received with a running fit in one of said grooves, with said rim extending between said groove top and second passage surfaces and said blades extending in the remainder of said one groove, said blades of said wheels dividing said passages into combustion and exhaust chambers and an intermediate expansion chamber, and said duct formations being externally exposed to the atmosphere peripherally throughout except at said rib formations; and conduit means between said compressor outlet and combustion chambers.

7. The combination in a turbine engine as in claim 6, in which said casing has about said axis a ring-like manifold from one side of which said duct formations branch, and said conduit means connect said compressor outlet with said manifold.

8. The combination in a turbine engine as in claim 6, in which said casing has spider formations extending from said rib formations inwardly toward said axis and providing bearings for said shafts, respectively.

9. The combination in a turbine engine as in claim 6, in which said casing is formed in two end sections and an intermediate section parted in planes normal to said axis and passing through said grooves, respectively, to leave said sections with complemental parts of said rib formations, respectively, and said complemental parts of said rib formations have inward disc extensions flanking both sides of and enclosing said wheels, respectively, to their rims and forming aligned bearings for said shafts, respectively, with said disc extensions having apertures through which to expose the respective wheels to the atmosphere.

10. The combination in a turbine engine as in claim 6, in which said drive and output shafts carry the wheels next to and remote from said combustion chambers, respectively, and are axially spaced, of which said drive shaft extends from the wheel it carries forwardly along and beyond said combustion chambers, said casing has a spider formation extending from the rib formation most remote from said combustion chambers inwardly toward said axis and providing bearing means in which said output shaft is journalled with a length other than an endlength thereof facing said drive shaft, and there is further provided an output drive with meshing bevel gears of which one is mounted on said endlength of said output shaft, a power take-off shaft extending with its axis between adjacent duct formations and transversely of said drive shaft axis and carrying the other bevel gear in the space between said drive and output shafts, and other bearing means for said take-off shaft.

11. The combination in a turbine engine as in claim 10, in which said other bearing means is also provided by said spider formation.

12. The combination in a turbine engine as in claim 9, in which said shafts are axially spaced, and there is further provided an output drive with meshing bevel gears of which one is mounted on an endlength of said output shaft facing said drive shaft, a power take-off shaft extending with its axis between adjacent duct formations and transversely of said drive shaft axis and carrying the other bevel gear in the space between said drive and output shafts, and other bearing means for said take-off shaft.

13. The combination in a turbine engine as in claim 9, in which said shafts are axially spaced, and there is further provided an output drive with meshing bevel gears of which one is mounted on an endlength of said output shaft facing said drive shaft, a power take-off shaft extending with its axis between adjacent duct formations and transversely of said drive shaft axis and carrying the other bevel gear in the space between said drive and output shafts, and bearing means on said intermediate casing section for said take-off shaft.

14. The combination in a turbine engine as in claim 9, which further provides another casing section next to the one end section forming said combustion chambers, said one and said other sections forming complemental parts of a ring-shaped manifold about said axis from one manifold side of which said combustion chambers branch, and also forming complemental parts of an annular compressor passage to said manifold, with said one and said other sections being parted in a plane normal to said axis and passing through said manifold, and said other section being formed in complemental subsections parted in a plane in which said axis lies.

References Cited
UNITED STATES PATENTS 2,619,797  12/1952  Haworth _____ 60—39.16
2,625,790  1/1953   Petrie _____ 60—39.16

JULIUS E. WEST, *Primary Examiner.*